(12) United States Patent
Anderson et al.

(10) Patent No.: US 7,453,281 B2
(45) Date of Patent: Nov. 18, 2008

(54) INTEGRATED CIRCUIT WITH ANTI-COUNTERFEITING MEASURES

(75) Inventors: Brent Alan Anderson, Jericho, VT (US); Edward Joseph Nowak, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 11/622,040

(22) Filed: Jan. 11, 2007

(65) Prior Publication Data

US 2008/0169833 A1 Jul. 17, 2008

(51) Int. Cl.
*H03K 19/00* (2006.01)

(52) U.S. Cl. .................. 326/8; 257/403; 726/34
(58) Field of Classification Search ........... 326/8
See application file for complete search history.

(56) References Cited

U.S. PATENT DOCUMENTS

| | | | |
|---|---|---|---|
| 4,583,011 A | 4/1986 | Pechar | |
| 4,766,516 A | 8/1988 | Ozdemir et al. | |
| 5,295,187 A | 3/1994 | Miyoshi | |
| 5,394,274 A | 2/1995 | Kahn | |
| 6,064,110 A * | 5/2000 | Baukus et al. | 257/652 |
| 6,085,319 A * | 7/2000 | Uemura | 713/1 |
| 6,246,254 B1 | 6/2001 | Choukalos et al. | |
| 6,535,016 B2 | 3/2003 | Choukalos et al. | |
| 2004/0257112 A1* | 12/2004 | Hidaka et al. | 326/82 |
| 2005/0017752 A1* | 1/2005 | Kim | 326/8 |

FOREIGN PATENT DOCUMENTS

EP 00316805 A2 5/1989

OTHER PUBLICATIONS

Sandige, R.S., "Bistable Devices", The Electrical Engineering Handbook, 2nd Edition, Section 79.3—pp. 24-25.*

* cited by examiner

*Primary Examiner*—James H. Cho
*Assistant Examiner*—Jany Tran
(74) *Attorney, Agent, or Firm*—W. Riyon Harding

(57) ABSTRACT

An anti-counterfeiting circuit that is incorporated into an authentic integrated circuit (IC) design, which induces a random failure in a counterfeited IC when the counterfeit IC is manufactured from a reverse-engineered authentic IC. The anti-counterfeiting circuit uses two signals of differing frequencies, which activate a disrupt signal when the two signals meet a predetermined failure criteria, for example, equivalent rising edges. The disrupt signal causes a signal gate or similar element within the counterfeited IC to fail, disrupt, or in some way change a designed behavior of the IC. The disrupt signal may be reset so that the failure will occur again when predetermined failure criteria are met. The authentic IC functions according to design because at least one of the elements in the anti-counterfeit circuit is a camouflage circuit, thus, in an authentic IC the anti-counterfeit circuit is not operatively coupled.

6 Claims, 4 Drawing Sheets

INTEGRATED CIRCUIT WITH ANTI-COUNTERFEITING MEASURES

BACKGROUND OF THE INVENTION

1. Field of the Invention

This invention relates to anti-counterfeiting measures for integrated circuits (IC's) and more specifically to an anti-counterfeiting circuit, which changes the function of an authentic circuit when copied into a counterfeit IC. The anti-counterfeiting circuit is disabled by using camouflage circuits when it is incorporated in the authentic IC design.

2. Background of the Invention

Counterfeit integrated circuit chips have become a significant problem for nearly every industry that relies on electronics for data communication, data management, and data processing. For example, the banking industry uses IC's for security purposes that need to be safe from counterfeiting; government programs, such as defense, have a high security requirement on circuitry to prevent technology from falling into adverse possession; and high volume consumer electronics with large profit margins are subject to counterfeiting such as gaming boxes, routers, and cellular telephones.

Some counterfeit IC's have additional logic which secretly routes data from the IC to adverse persons such as hackers and snoopers who can obtain secure information such as credit card numbers, account numbers, and passwords from the IC's.

Counterfeiters typically reverse engineer an existing IC by processes such as delamination or delayering. The authentic IC is delayered one layer at a time and the circuit configuration of that particular layer is copied as a new schematic layout which can be used for manufacturing the counterfeit IC. Other reverse engineering techniques include the use of scanning electron microscopes (SEM's) and backside imaging which requires that the chip be polished very thinly so that the photon emission from electrons can be seen through the substrate and recorded.

Based on the foregoing problems, an anti-counterfeiting circuit, integrated into an IC such that the IC functions as designed when it is the authentic IC, and randomly fails when it is a counterfeit IC is desired.

BRIEF SUMMARY OF THE INVENTION

It is an object of the invention to provide an integrated circuit which operates as designed when fabricated by an original manufacturer using an authentic IC layout; and fails unpredictably when it is manufactured by an unauthorized manufacturer using a reverse-engineered IC layout.

It is a further object of the invention to produce random fails and/or disruptions within the counterfeit circuit to make the failures more difficult to diagnose.

An embodiment of the present invention comprises an anti-counterfeiting circuit adapted to cause failures or otherwise disrupt the functionality of a counterfeited IC. The anti-counterfeiting circuit comprises one element which has inputs from at least two signals, which may be generated by signal generators, the signals having different frequencies or different independent phases, the element activates a disrupt signal when each of the signals satisfy a predetermined condition. A second element coupled to the first element and coupled to the IC through a second output signal changes the functionality of the IC. At least one of the elements comprising the anti-counterfeiting circuit is a camouflage element and thus the anti-counterfeiting circuit is not operatively coupled to an authentic IC.

In another embodiment of the present invention, the anti-counterfeiting circuit comprises an additional logic element which provides more control of the anti-counterfeiting circuit and signal gating measures.

DETAILED DESCRIPTION

Figure 1:
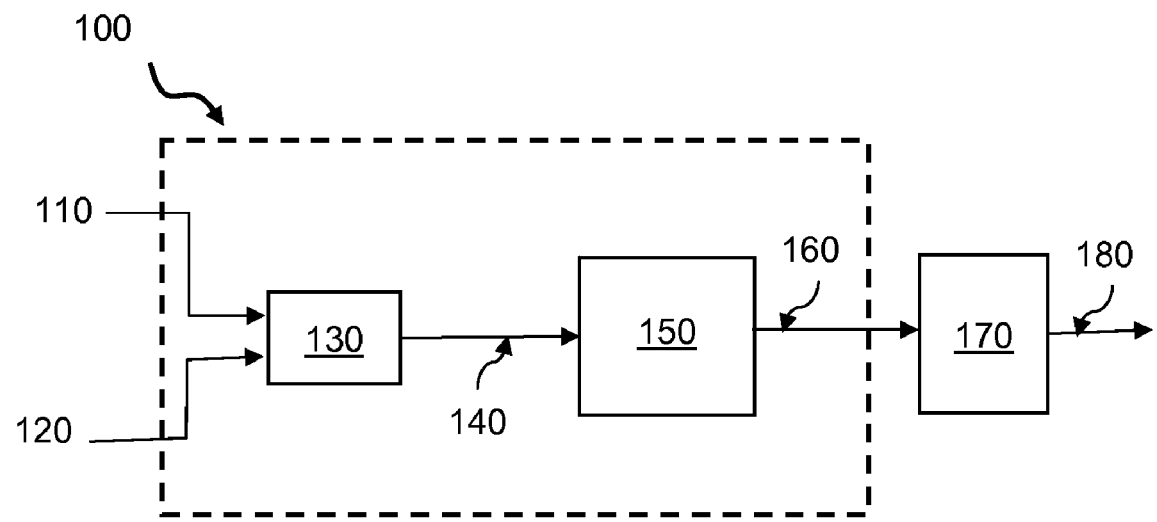
FIG. 1 illustrates an example anti-counterfeiting circuit according to an embodiment of the present invention.

FIG. 1 shows an example of an anti-counterfeiting circuit 100 according to an embodiment of the present invention. Anti-counterfeiting circuit 100 includes a first signal 110, a second signal 120, both of which are inputs to a first element 130. Element 130 provides a third signal 140 to a second element 150, which provides a fourth signal 160 to functional logic 170 within the integrated circuit. As may be appreciated by one skilled in the art, element 130 is not limited to only two inputs but may receive as many inputs as desired.

When first and second signals 110 and 120 satisfy a predetermined condition, detected by element 130, element 130 generates signal 140, thus enabling element 150 to generate signal 160, hence causing functional logic 170 to fail (i.e. perform in a manner not intended by the original design). Note that signals 110 and/or 120 may be generated by oscillator circuits, explicitly for the purpose of causing a random failure in time of a counterfeit design, or may be derived signals which comprise a part of the functional integrated circuit. In particular, two or more isolated ring oscillator circuits are one means of generating signals 110 and 120 with uncorrelated phases.

In an authentic integrated circuit it is desirable to disable anti-counterfeiting circuit 100 so that no failure occurs in the authentic integrated circuit during normal operation. This is accomplished, for example, by disguising either one or both of elements 130 and 150 to appear coupled to functional logic 170 when viewed as a delaminated structure. In fact, however, there exists no electric coupling to functional logic 170, i.e. the (otherwise) fail-causing signal is not transmitted to functional logic. An alternative means of disabling the anti-counterfeiting circuit in the authentic integrated circuit includes application of a camouflage technique to a portion of functional logic 170 to be insensitive to signal 160. One way to create the disguise is to change the doping levels of either one or both of elements 130 and 150 during manufacturing thereby creating an open circuit, or modifying dopant levels to make functional logic 170 be insensitive to the signal 160. There are many other techniques known in the art for camouflaging a circuit so that it provides a function which differs from what would be expected based on the physical appearance of the circuit.

Figure 2:
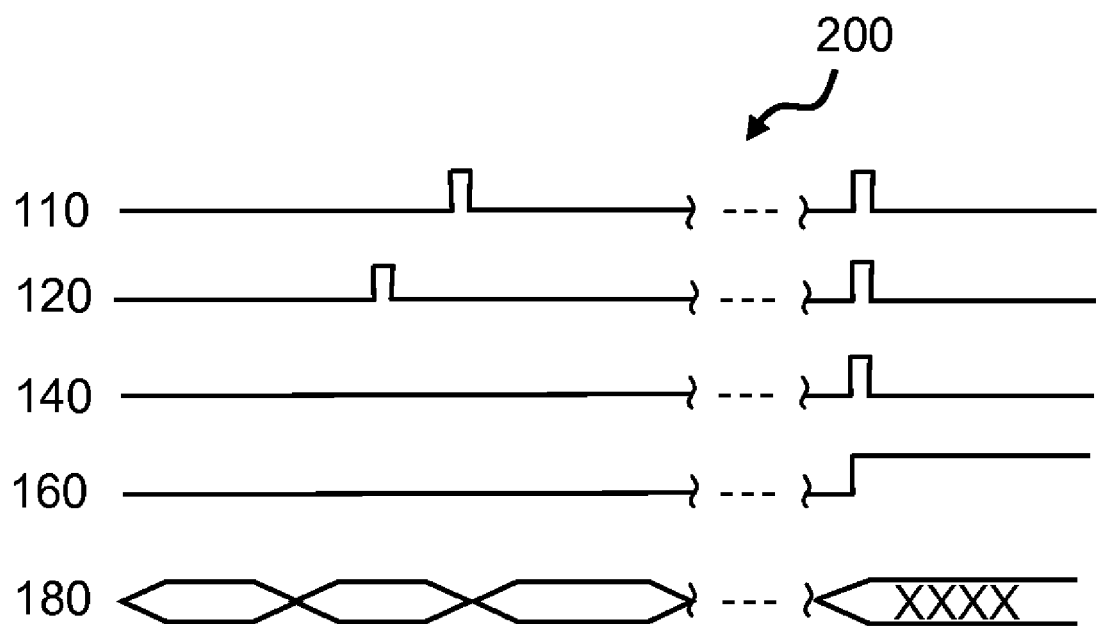
FIG. 2 is a timing diagram showing the operation of the anti-counterfeiting circuit according to one embodiment the present invention.

FIG. 2 illustrates an example timing diagram for an active anti-counterfeit circuit 100, i.e. anti-counterfeiting circuit 100 has been manufactured so that elements 130 and 150 are electrically coupled to functional logic 170.

When signals 110 and 120 satisfy a predetermined condition, shown in FIG. 2 as having pulses which occur at the same time, element 130 generates signal 140. When signal 140 is generated, element 150 generates and sustains signal 160. Signal 160 causes a failure in functional logic 170 as illustrated in FIG. 2. signal 180, the output signal of functional logic 170. For illustrative purposes, the signal produced by signal gate 150 in FIG. 2 is shown as an unknown data value. However, any signal behavior may be implemented depending on the designer's intentions for failure, such as, for example, High, Low, High-Z (high impedance), or metastable. A failure is considered to be any behavior in which functional logic 170 does not respond as it was designed, and/or fails unpredictably.

The failure rate in exemplary waveform set 200 is determined by the following equation 1:

$$FR = F1 * F2 * W \qquad \text{Equation 1:}$$

Where F1 is the frequency of signal 110 and F2 is the frequency of signal 120, and signals 110 and 120 are uncorrelated (i.e. of random phase). W is a predetermined time window in which signals 110 and 120 must satisfy a predetermined condition in order for element 130 to generate signal 140. For example, it may be required that signal 110 present a logical '1' within a time span 'W' of signal 120 presenting a logical '1' for element 130 to generate signal 140. It is clear that the concept described above can be generalized to greater than two input signals, all of which must present a similar predetermined condition to element 130 for element 130 to generate signal 140. Equation 1, with 'N' such signal inputs that are required to satisfy predetermined criteria within a time span 'W', may be generalized to the following equation:

$$FR = F1 * F2 * \ldots FI \ldots * FN * W^{(N-1)} \qquad \text{Equation 2:}$$

The occurrence of failing events generated by this circuit will behave chaotically as long as the phases and/or frequencies of the signals F1 . . . FN are random with respect to one another. N identically designed ring oscillators that are electrically isolated from one another will each have slightly different frequencies of oscillation due to random and systematic process variations within a die, such as random dopant fluctuation, across-chip line-width variation, and gate-dielectric charge fluctuations. Furthermore, from Eq. 2, it is evident that the mean time to an induced failure can be designed over a wide range of time scales by examining the case where F1=F2 . . . =FN since the ratio F1/W can easily be designed to be a very small number (1/10 to 1/100), and hence the failure rate, $F1*(F1/W)^{(N-1)}$ spans a large range with small increments of N.

Figure 3:
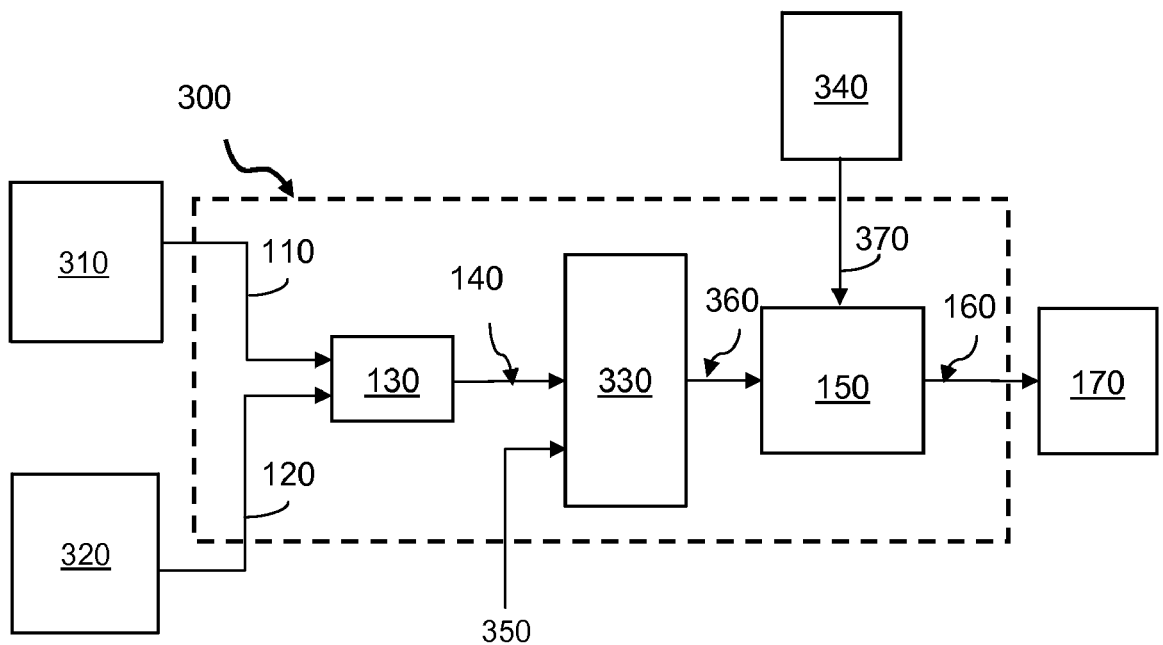
FIG. 3 illustrates an example anti-counterfeiting circuit according to a second embodiment of the present invention.

FIG. 3 illustrates a second embodiment of the present invention including anti-counterfeit circuit 300 which further includes signals 110 and 120, element 130, which generates signal 140 when signals 110 and 120 satisfy a predetermined condition; and a latch 330, which latches signal 140 and can be reset by signal 350. Latch 330 generates signal 360, which is input to element 150. Element 150 further includes a second input from a signal 370, and provides output signal 160 to functional logic 170.

FIG. 3 further illustrates a sub-circuit 310 and a sub-circuit 320 which respectively generate signals 110 and 120, and a second functional logic 340, which generates signal 370.

In an authentic IC, anti-counterfeiting circuit 300 is not operatively coupled to the IC. At least one of sub-circuits 310 and 320, latch 330, and/or elements 130 and 150 are disguised to appear from a view of the physical IC as being operatively (e.g. electrically) coupled, but in fact are not actually coupled. For example, element 130 may be manufactured to appear as an AND gate when viewed in a delaminated state, however, element 130 is actually an open circuit and does not function as an AND gate. The fabrication of element 130 as a true AND gate operatively couples anti-counterfeiting circuit 300 to the IC, thus activating anti-counterfeiting circuit 300.

When anti-counterfeiting circuit 300 is electrically coupled to the IC, element 130 detects when signals 110 and 120 satisfy a predetermined condition. The predetermined condition may be, for example: effectively equivalent to, equal (e.g. same rising edge, same falling edge, etc.), proportional, analogous, dissimilar, undetectable, non-determinant, or unequal (e.g. directly opposing values, etc.). Element 130 generates signal 140, which is latched in latch 330 which further generates signal 360 thus enabling element 150 to cause a failure in functional logic 170. A failure includes causing the functionality of the integrated circuit to fail or otherwise disrupt, with respect to its intended function.

Figure 4:
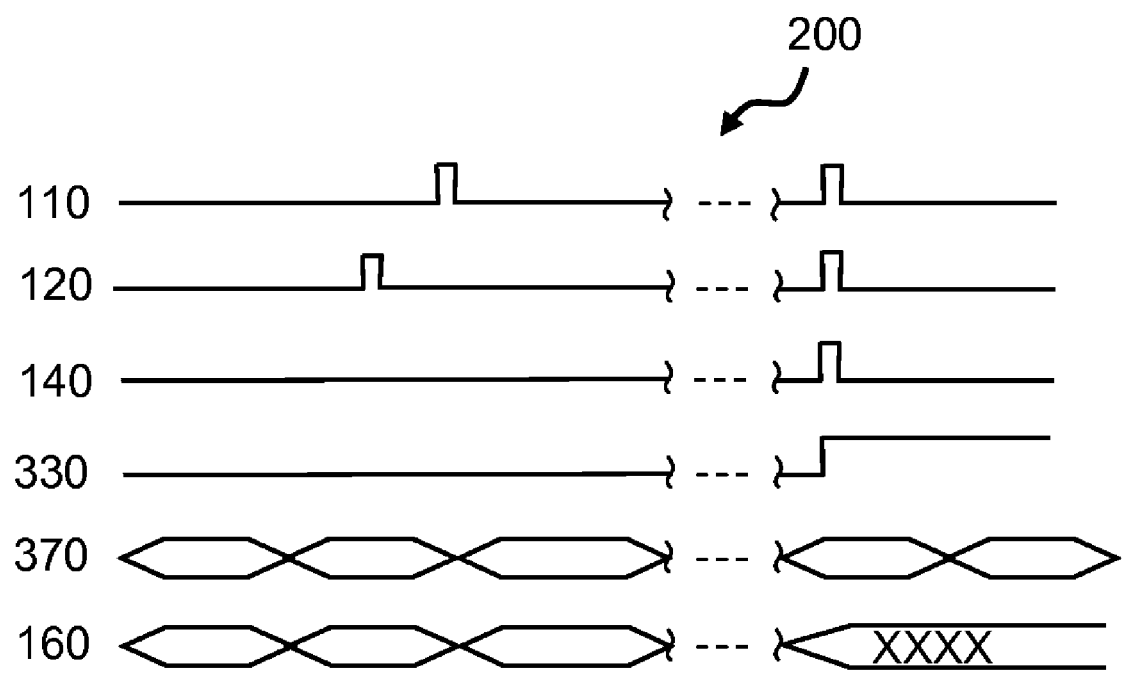
FIG. 4 is a timing diagram showing the operation of the anti-counterfeiting circuit according to the second embodiment the present invention.

For illustrative purposes, signal 160 produced by element 150 in FIG. 4 is shown as having an unknown value when element 150 is enabled. However, any function for signal 160 may be implemented depending on the designer's intentions for failure, such as, for example, a High value, a Low value, a High-Z value (high impedance), or a metastable value.

In one mode of operation, element 150 acts as a signal gate by, for example, stopping or altering the input signal from functional logic element 340 and sending the altered data to functional logic 170 via signal 160. FIG. 4 is an example timing diagram that illustrates this mode of operation.

Anti-counterfeiting circuit 300 may be incorporated into any IC design. Sub-circuits 310 and 320 may be, for example, circuits already existing in the IC design that produce a signal at a specific frequency (e.g. ring oscillators or signal generators) where the frequency (F1) of the signal generated by sub-circuit 310 differs from the frequency (F2) of the signal generated by sub-circuit 320. As can be appreciated by one of ordinary skill in the art, anti-counterfeiting circuit 300 is not limited to two frequency signals and can accommodate as many frequency signals as desired. Additionally, sub-circuit 310 and/or sub-circuit 320 may be coupled to a corresponding circuit or element such as a one-shot (monostable multivibrator) circuit (not shown).

Signal 350 resets latch 330 when activated, thereby deactivating signal 360, and the operation of the integrated circuit resumes intended functionality until the two signals 110 and 120 satisfy a predetermined condition within some time window W and element 130 generates signal 140 once again. Signal 350 is activated by various means, for example, at system power-up, when the system is in a specific state, at a clock interval, from another circuit located within the IC, etc.

The invention described herein is useful as a service which can be provided by IC designers/manufacturers for their IC customers who suffer from the effects of counterfeiting. The service includes integrating an anti-counterfeiting circuit 100 and/or anti-counterfeiting circuit 300 into an IC design of a customer and manufacturing the resulting IC; at least one element 130 and 150 in anti-counterfeiting circuit 100 and/or at least one of sub-circuits 310 and 320, latch 330, and elements 130 and 150 of anti-counterfeiting circuit 300 are disguised to appear operatively coupled to the IC when viewed on a physical delaminated IC chip, but are not actually electrically coupled. The result is an authentic IC which functions as the customer intended, yet fails, does not function according to design and/or otherwise causes disruption in the functionality of the IC when the circuit is operatively coupled in a counterfeited IC.

The above description and drawings are only to be considered illustrative of exemplary embodiments, which achieve the features and advantages of the invention. It should be appreciated by one of ordinary skill in the art that modification and substitutions to layout and circuit designs, disguised circuit elements, signal generating elements, frequency generators, criteria for activating the disrupt signal, and function of the circuitry coupled to the disrupt signal can be made without departing from the spirit and scope of the invention. Accordingly, the invention is not to be considered as being limited by the foregoing description and drawings.

What is claimed is:

1. A circuit which causes disruption in an integrated circuit (IC) when operatively coupled to the IC, the circuit comprising:
   a first element having a first input for receiving a first signal (110) which is generated by at least a first oscillator and a second input for receiving a second signal (120), and a first output coupled to an input of a second element (150), the first element generates a third signal (140) on the first output when the first and second signals satisfy a predetermined condition;
   the second element comprises a second output (160) coupled to the IC (170);
   at least one of the first or second element appears to be coupled to the IC in a view of the circuit:
   the circuit being inoperative when at least one of the first or second element is not operatively coupled to the IC;
   the circuit being operative when the first and second element are operatively coupled to the IC; and
   wherein the circuit is not coupled to the IC when the first oscillator comprises a camouflage circuit.

2. A circuit which causes failure in an integrated circuit (IC) when operatively coupled to the IC, the circuit comprising:
   a first element having a first input for receiving a first signal (110) and a second input for receiving a second signal (120), and a first output coupled to an input of a second element (330), an output of the second element coupled to a third element (150), the first element generates a third signal (140) on the first output when the first and second signals satisfy a predetermined condition;
   the third element comprises a second output (160) coupled to the IC (170);
   wherein the first signal, the second signal, the first element, the second element, and the third element, appear to be coupled to the IC in a view of the circuit:
   the circuit being inoperative when at least one of the first, second or third element is not operatively coupled to the IC;
   the circuit being operative when each of the first, second and third element is operatively coupled to the IC; and
   wherein the circuit is not operatively coupled to the IC when at least one of the first, second or third element comprises a camouflage element.

3. The circuit of claim 2, further comprising at least a first oscillator providing the first signal; the first oscillator comprising a ring oscillator; and
   wherein the circuit is not coupled to the IC when the first oscillator comprises a camouflage circuit.

4. The circuit of claim 2, wherein the circuit deactivates the second output when a second predetermined condition is satisfied and the circuit is operatively coupled to the IC; and
   wherein the second output is deactivated by a second circuit within the IC and coupled to the circuit.

5. A method of providing anti-counterfeiting measures for an integrated circuit comprising the steps of:
   providing a circuit which further comprises
   a first element having a first input for receiving a first signal (110) and a second input for receiving a second signal (120), and a first output;
   a second element having a third input which is coupled to the first output and having a second output (160) coupled to the IC (170);
   generating a third signal (140) on the first output when the first and second signals satisfy a predetermined condition;
   at least one of the first or second element appearing to be coupled to the IC in a view of the circuit;
   the circuit being inoperative when at least one of the first or second element is not operatively coupled to the IC;
   disrupting the functionality of the IC to create a fail when the first and second elements are operatively coupled to the IC and when the predetermined condition is satisfied;
   deactivating the circuit when a second predetermined condition is satisfied; and
   wherein a second circuit which is integrated within the IC and coupled to the circuit, deactivates the circuit.

6. The method of claim 5, wherein the occurrence of the fail is controlled by designing the circuit using at least one of the group consisting of choosing a number of signals to drive the circuit, choosing frequencies for the signals, and choosing the predetermined condition.

* * * * *